US012160453B2

(12) United States Patent
Wegweiser et al.

(10) Patent No.: US 12,160,453 B2
(45) Date of Patent: Dec. 3, 2024

(54) FRAMEWORK FOR AUTOMATICALLY ESTABLISHING SECURE CONNECTIONS FOR STREAMING AUDIO AND VIDEO DATA BETWEEN DEVICES BASED ON DEVICE STATE CRITERIA

(71) Applicant: Apple Inc., Cupertino, CA (US)

(72) Inventors: Zak C. Wegweiser, Redwood City, CA (US); Justin R. Etzine, San Jose, CA (US); Kevin C. Tulod, San Lorenzo, CA (US); Robert B. McIndoe, San Jose, CA (US); Sasanka T. Vemuri, San Ramon, CA (US); Sri Ranjan Srikantam, Santa Clara, CA (US); Yu Xing, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/328,612

(22) Filed: Jun. 2, 2023

(65) Prior Publication Data

US 2023/0396656 A1 Dec. 7, 2023

Related U.S. Application Data

(60) Provisional application No. 63/365,802, filed on Jun. 3, 2022.

(51) Int. Cl.
*H04L 65/403* (2022.01)
*G06F 3/0346* (2013.01)
(Continued)

(52) U.S. Cl.
CPC ........ *H04L 65/1069* (2013.01); *G06F 3/0346* (2013.01); *H04L 65/403* (2013.01);
(Continued)

(58) Field of Classification Search
CPC ............ H04N 7/142; H04N 21/43615; H04N 21/43637; H04N 23/661; H04N 21/64707;
(Continued)

(56) References Cited

U.S. PATENT DOCUMENTS

2011/0273526 A1* 11/2011 Mehin ................. H04L 65/1069
709/227
2013/0342637 A1* 12/2013 Felkai ..................... H04L 69/24
348/E7.083

(Continued)

*Primary Examiner* — Shirley X Zhang
(74) *Attorney, Agent, or Firm* — Blank Rome LLP

(57) ABSTRACT

Devices, methods, and non-transitory program storage devices are disclosed to enable the automatic establishment of a secure audio/video data streaming connection between electronic devices. For example, a first electronic device may enter into a first state of a peer device advertising protocol, and then, based on a determination that the first electronic device meets a first set of device state criteria (e.g., including at least an orientation state criterion), the first electronic device may enter into a second (e.g., enhanced) state of the peer device advertising protocol. In response to detecting a presence of a second electronic device in its proximity, the first electronic device may connect to the second electronic device via a secure peer-to-peer connection protocol and then send one or more images captured by a first image capture device of the first electronic device to the connected second electronic device via the secure wireless peer-to-peer connection protocol.

20 Claims, 9 Drawing Sheets

(51) Int. Cl.
  *H04L 65/1069*   (2022.01)
  *H04N 21/4363*   (2011.01)
  *H04N 21/647*    (2011.01)
  *H04N 23/63*     (2023.01)
  *H04N 23/661*    (2023.01)
  *H04W 8/00*      (2009.01)
  *H04W 76/14*     (2018.01)

(52) U.S. Cl.
  CPC . *H04N 21/43637* (2013.01); *H04N 21/64707* (2013.01); *H04N 23/63* (2023.01); *H04N 23/661* (2023.01); *H04W 8/005* (2013.01); *H04W 76/14* (2018.02)

(58) Field of Classification Search
  CPC .. H04W 8/005; H04L 65/1069; H04L 65/403; G06F 3/0346
  See application file for complete search history.

(56) References Cited

U.S. PATENT DOCUMENTS

| | | | |
|---|---|---|---|
| 2015/0032812 A1* | 1/2015 | Dudley | H04N 21/4431 |
| | | | 709/204 |
| 2015/0304604 A1 | 10/2015 | Sharma | |
| 2016/0259497 A1* | 9/2016 | Foss | G06F 3/0488 |
| 2016/0277708 A1 | 9/2016 | Rintel | |
| 2018/0316768 A1* | 11/2018 | Goldsmith | H04L 67/52 |
| 2021/0282075 A1 | 9/2021 | Gwak | |
| 2023/0319413 A1* | 10/2023 | Manzari | H04N 23/632 |
| | | | 348/211.11 |
| 2023/0370507 A1* | 11/2023 | Chang | G06F 3/0482 |

* cited by examiner

FRAMEWORK FOR AUTOMATICALLY ESTABLISHING SECURE CONNECTIONS FOR STREAMING AUDIO AND VIDEO DATA BETWEEN DEVICES BASED ON DEVICE STATE CRITERIA

TECHNICAL FIELD

This disclosure relates generally to the field of audio and video data streaming. More particularly, but not by way of limitation, it relates to techniques for automatically establishing secure connections between a user's devices for the streaming of audio and video data.

BACKGROUND

The advent of portable integrated computing devices has caused a wide proliferation of cameras and other video capture-capable devices. These integrated computing devices commonly take the form of smartphones, tablets, or laptop computers, and typically include general purpose computers, cameras, sophisticated user interfaces including touch-sensitive screens, and wireless communications abilities through Wi-Fi, Bluetooth, LTE, HSDPA, New Radio (NR), and other cellular-based or wireless technologies. The wide proliferation of these integrated devices provides opportunities to use the devices' capabilities to perform tasks that would otherwise require dedicated hardware and software.

For example, portable integrated computing devices, such as smartphones, tablets, and laptops typically have two or more embedded cameras. These cameras generally amount to lens/camera hardware modules that may be controlled through the use of a general-purpose computer using firmware and/or software (e.g., "Apps") and a user interface, including touch-screen buttons, fixed buttons, and/or touchless controls, such as voice control. The integration of high-quality cameras into these portable integrated communication devices, such as smartphones, tablets, and laptop computers, has enabled users to capture and share images and videos in ways never before possible. It is now common for users' smartphones to be their primary image capture device of choice.

Along with the rise in popularity of photo and video sharing via portable integrated computing devices having integrated cameras has come a rise in videoconferencing via such portable integrated computing devices. In particular, users often engage in videoconferencing calls or meetings, with the video images typically captured by a front-facing camera on the device, i.e., a camera that faces in the same direction as the camera device's display screen. Most prior art cameras are optimized for either wide-angle, general photography or for narrower-angle photography, e.g., self-portraits and videoconferencing streaming use cases. Those cameras that are optimized for wide angles are typically optimized for group and landscape compositions, but are not optimal for individual portraits, due, e.g., to the distortion that occurs when subjects are at short distances from the camera or at the edges of the camera's field of view.

"Field of view" or "FOV," as used herein, refers to the angular extent of a given scene that is imaged by a camera. FOV is typically measured in terms of a number of degrees, and may be expressed as a vertical FOV, horizontal FOV, and/or diagonal FOV. The diagonal FOV of the image sensor is often referred to herein, as it is a more relevant measure of the camera's optics, since it attempts to cover the corners of the image, where "roll off," i.e., vignetting, problems associated with pixels at the corners of the image sensor may become more pronounced. For reference, a typical 35 mm camera with a lens having a focal length of 50 mm will have a horizontal FOV of 39.6°, a vertical FOV of 27.0°, and a diagonal FOV of 46.8°.

Cameras that are optimized for portraits and video conference streaming (e.g., "front-facing" cameras) are not typically optimal for landscapes and group photos (or group videoconferencing calls) because of their limited field of view. Moreover, the field of view of a given camera also may influence how the user composes the shot (i.e., how far away and at what angle they position themselves with respect to the device's camera) and the quality of the ultimately captured image. Additionally, certain devices that may be the most comfortable or appropriate for a user to utilize during a lengthy videoconferencing call, e.g., a desktop computer with a standalone monitor or a laptop computer, may either have no integrated camera or a low-quality, integrated web camera.

Thus, in order to provide users with greater flexibility in image capture sources—and the ability to leverage higher-quality image capture devices during videoconferencing sessions (e.g., via a camera that is integrated into one of their portable communication devices)—it would be desirable to have methods and systems that provide such users the ability to seamlessly and automatically create secure connections between their electronic devices at contextually-appropriate times, e.g., to allow for the streaming of audio and/or video image data that is captured by a first electronic device directly to a second electronic device for subsequent presentation, storage, or further transmission by the second electronic device.

SUMMARY

Devices, methods, and non-transitory program storage devices (NPSDs) are disclosed herein to enable the automatic establishment of secure audio/video data streaming connections between electronic devices, e.g., electronic devices that are associated with a same user or a same user account. For example, a first electronic device comprising at least a first image capture device and a first positional sensor may enter into a first state of a peer device advertising protocol, and then determine a first orientation state of the first electronic device based, at least in part, on information obtained from the first positional sensor. In response to determining that the first electronic device meets a first set of device state criteria, the first electronic device may then enter into a second state of the peer device advertising protocol (e.g., an "enhanced" or "high power" advertising state), wherein determining that the first electronic device meets the first set of device state criteria comprises determining that the first orientation state is within a threshold difference of a predetermined device activation orientation state (e.g., wherein the device activation orientation state may comprise a portrait orientation state, a landscape orientation state, or the like).

In response to detecting a presence of a second electronic device in proximity to the first electronic device while in the second state of the peer device advertising protocol, the first electronic device may connect to the second electronic device via a secure wireless peer-to-peer connection protocol, and then the first electronic device may send one or more images captured by the first image capture device to the connected second electronic device via the secure wireless peer-to-peer connection protocol (wherein, e.g., the secure wireless peer-to-peer connection protocol may be a different protocol than the peer device advertising protocol that was used to initially establish the connection between the devices).

In some embodiments, an interruption event may be detected at the first electronic device, during which the sending of images and/or video data to the second electronic device may be paused. In other embodiments, the first electronic device may receive image capture-related parameters from the second electronic device and then capture subsequent images with the first image capture device according to the received image capture-related parameters.

According to other embodiments, the first set of device state criteria may further comprise: determining that the first electronic device has exhibited below a threshold amount of motion over a determined period of time; determining that the first electronic device is in at least one of the following states: a standby state; a lock screen state; a screen off state; an active communication session; or an idle state; and/or determining that the first image capture device is oriented in a preferred direction relative to the second electronic device.

In some other embodiments, the "enhanced" second state of the peer device advertising protocol may have a higher duty cycle and/or a shorter advertising interval between advertising packets than the first state of the peer device advertising protocol.

In still other embodiments, in response to determining that the first electronic device does not meet the first set of device state criteria, the first electronic device may remain in the first state of the peer device advertising protocol and not attempt to connect to any peer devices via the secure wireless peer-to-peer connection protocol.

In yet other embodiments, in response to not detecting a presence of a second electronic device in proximity to the first electronic device while in the second state of the peer device advertising protocol, the first electronic device may enter into a third state of the peer device advertising protocol, wherein the third state of the peer device advertising protocol has a shorter advertising interval than the first state of the peer device advertising protocol—but a longer advertising interval between advertising packets than the second state of the peer device advertising protocol.

In still other embodiments, in response to determining that the first electronic device no longer meets the first set of device state criteria, the first electronic device may disconnect from the second electronic device via the secure wireless peer-to-peer connection protocol.

The techniques disclosed herein may also be used to perform a "handoff" method for communication sessions, e.g., active audiovisual (A/V) communication sessions, i.e., handing off control of a communication session from a first electronic device associated with a user to a second electronic device associated with the user. According to some embodiments, the method may comprise: receiving, at a second electronic device associated with a first user, an indication that a first electronic device associated with the first user is providing one or more images captured by an image capture device of the first electronic device via an active communication session; and then, in response to identifying the first electronic device as meeting a first set of device state criteria: 1) joining, at the second electronic device, the active communication session on behalf of the first user (e.g., automatically joining the session or joining in response to confirmatory user input); and 2) selecting the image capture device of the first electronic device as an image source for the second electronic device in the active communication session. Once management of the communication session has been handed off to the second electronic device, it may begin to receive one or more images captured by the image capture device of the first electronic device (e.g., via a secure wireless peer-to-peer connection protocol) and then provide the one or more images received from the first electronic device to the active communication session. In some embodiments, the second electronic device may also display and/or store the one or more images received from the first electronic device, and/or transmit the one or more images to a third electronic device.

In some embodiments, identifying the first electronic device as meeting a first set of device state criteria may further comprise: entering, at the second electronic device, into a peer device advertising protocol state, wherein the peer device advertising protocol state may comprise at least one of the following: a default advertising state; an enhanced advertising state; or a reduced-power advertising state. In still other embodiments, identifying the first electronic device as meeting a first set of device state criteria further may comprise detecting a presence of the first electronic device via the peer device advertising protocol. In yet other embodiments, identifying the first electronic device as meeting a first set of device state criteria further comprises detecting, at the second electronic device, that the first electronic device is in proximity to the second electronic device and oriented in a first orientation state that is within a threshold difference of a predetermined device activation orientation state. In further embodiments, identifying the first electronic device as meeting a first set of device state criteria further comprises detecting, at the second electronic device, that the first electronic device is in proximity to the second electronic device and that the image capture device of the first electronic device is oriented in a preferred direction relative to the second electronic device.

According to yet other embodiments, a method is disclosed, comprising: receiving, at a second electronic device, an indication that a first electronic device is requesting the second electronic device to join an active communication session; in response to identifying the first electronic device as meeting a first set of device state criteria: 1) joining, at the second electronic device, the active communication session; and 2) selecting an image capture device of the first electronic device as an image source for the second electronic device in the active communication session; receiving, at the second electronic device, one or more images captured by the image capture device of the first electronic device; and providing, from the second electronic device, the one or more images received from the first electronic device to the active communication session. According to some such embodiments, the method may further comprise: displaying, at the second electronic device, the one or more images received from the first electronic device. According to other such embodiments, identifying the first electronic device as meeting a first set of device state criteria further comprises: entering, at the second electronic device, into a peer device advertising protocol state. According to still other such embodiments, the second electronic device may be configured to join the active communication session on behalf of the first user in response to user input. According to yet other such embodiments, the received one or more images captured by the image capture device of the first electronic device are received via a secure wireless peer-to-peer connection protocol. According to still yet other such embodiments, the method may further comprise: transmitting, by the second electronic device, the one or more images received from the first electronic device to a third electronic device.

Various non-transitory program storage device embodiments are also disclosed herein. Such NPSDs are readable by one or more processors. Instructions may be stored on the NPSDs for causing the one or more processors to perform any of the embodiments disclosed herein. Various image processing and secure device connection methods are also disclosed herein, in accordance with the embodiments disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Figure 1:
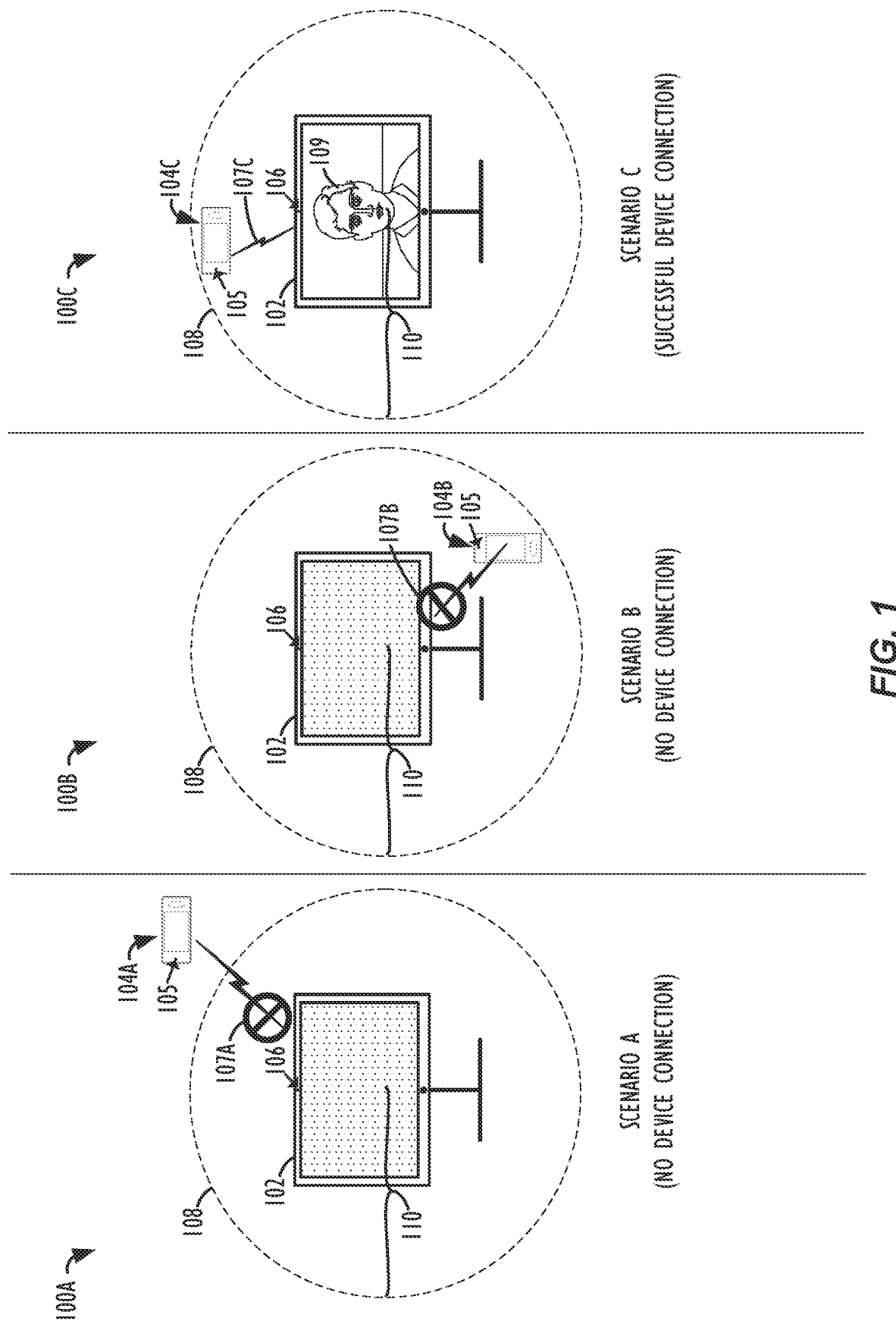
FIG. 1 illustrates exemplary electronic device configurations for attempting to establish a secure connection between the electronic devices for streaming audio and video data, according to one or more embodiments.

Exemplary Device Setups for Attempting to Establish Secure Connections between User Electronic Devices Turning now to FIG. 1, exemplary electronic device configurations 100 for attempting to establish a secure connection between the electronic devices for streaming audio and video data are shown, according to one or more embodiments. Turning first to Scenario A (100A), a first device (104A) and a second device (102) are in proximity to one another and attempting to form a secure connection. As used herein, the term "in proximity to" may refer to devices that are within a discoverability distance of each other for a given wireless connection protocol. According to some implementations, measured signal strength may be used as a proxy for estimating the distance between two devices to determine if they are within a sufficiently close range of one another. In some such implementations, the threshold signal strength required for determining that two devices are within sufficiently close proximity to one another may not be a fixed threshold, and it also may be based on filtering (e.g., averaging) signal strength values over time across many signal strength samples. In some embodiments, first device (104A) may comprise one or more image capture devices (105), and second device (102) may also comprise one more image capture devices (106). In some cases, an image capture device 105 of the first device may be of a higher quality than the image capture device(s) 106 of the second device, e.g., in terms of resolution, zoom, FOV, spatial resolution, focus, color quality, or any other imaging parameter. In such cases, it may be more desirable to use the image capture device 105 of the first device rather than the image capture device 106 of the second device to capture images to be used, displayed, stored, transmitted, etc., by the second device (102), e.g., as part of an active communication session. In still other cases, a user of the second device (102) may simply desire to select an image capture device of the first device (104A) for any number of other reasons, e.g., to provide a different (and/or additional) view of the scene around the second device (102), because the second device (102) may not have an image capture device of its own, because an image capture device of the second device (102) is not functioning properly, because an image capture device of the first device (104A) may have a special image capture feature or mode desired by the user of the second device (e.g., a "Portrait" or synthetic shallow depth of Field (SDOF) photography mode, a "Night" capture mode, a "Slow Motion" video capture mode, etc.), and so forth.

According to some embodiments disclosed herein, the first device must meet a first set of device state criteria before establishing a connection with the second device. In some such embodiments, the first set of device state criteria may comprise one or more of: 1.) an orientation state criterion; 2.) a device motion criterion; 3.) a device activity criterion; 4.) an active communication session criterion; 5.) a direction criterion; 6.) a proximity criterion; 7.) a user account criterion, and/or any number of other criteria, as may be desired to define the overall state of the first device in which the first device will be permitted to attempt to establish a secure connection with the second device.

1. Orientation State Criterion

For example, in some embodiments, an orientation state criterion may comprise a requirement that the first device be within a threshold difference of a predetermined device activation orientation state. In some instances, the device activation orientation state may be a perfect "landscape" (i.e., horizontal) or "portrait" (i.e., vertical) orientation state, i.e., a 0 degree rotation with respect to a measured horizontal (or vertical) axis, and the threshold difference permitted may be plus or minus 5 degrees, e.g., as measured by an internal positional sensor (e.g., an accelerometer) of the first device. In such instances, a first device may be deemed to satisfy the orientation state criterion any time it is oriented within plus or minus 5 degrees of a perfect landscape (or portrait, as the case may be) orientation. It is to be understood that the examples of a perfect landscape or portrait orientation are merely examples of device activation orientation states that could be defined in a given implementation and that any suitable and determinable device activation orientation state could be defined for a given implementation. In still other embodiments, the device activation orientation state could also comprise a specific gesture (e.g., rocking the phone back and forth a predetermined number of times, etc.) that indicates that the user intends to establish a secure connection with the first electronic device to another device in its proximity. In yet other embodiments, e.g., wherein the second electronic device has an integrated image capture device that the user is already within the FOV of, the enactment of a specific gesture by the user (e.g., a "hand wave" or "finger pointing" gesture, as captured and interpreted by the second electronic device or measured by another electronic device, e.g., a wearable device) may also be used as an indication that the user intends to establish a secure connection between the second electronic device and a first electronic device in its proximity. In some implementations, additional device sensors may also be used to confirm or enhance the understanding of the device's orientation state. For example, signals obtained from an ambient light sensor (ALS) and/or brightness sensor embedded in the device could be used as secondary cues to prevent false positive connections between devices, e.g., in scenarios when the device may, by chance, happen to be in the device activation orientation state (e.g., a perfect "landscape" orientation) while the device is in the users' pocket or a backpack, etc., which would likely be indicated by such ALS and/or brightness sensor reporting lower than a predetermined threshold ambient brightness level required to establish a secure device connection.

As shown in Scenario A (100A), the first device (104A) appears to be in a perfect landscape orientation. Thus, assuming an implementation where a landscape orientation was the defined device activation orientation state, the first device (104A) would meet that particular device state criterion. However, as will be discussed in greater detail below, additional device state criterion could also be defined and need to be met before the first device would be eligible to attempt to establish the secure connections described herein with the second device (102).

2. Device Motion Criterion

In other embodiments, a device motion criterion may comprise determining that the first device has exhibited below a threshold amount of motion over a determined period of time. Such a device motion criterion may be used, e.g., if it is desired that the first device is mounted or otherwise held stationary for a determined period of time before being eligible to attempt to establish a secure connection with the second device (102).

3. Device Activity Criterion

In still other embodiments, a device activity criterion may comprise determining that the first electronic device is in at least one of the following states: a standby state; a lock screen state; a screen off state; or an idle state. Such a device activity criterion may be used, e.g., if it is desired that the first device is not being actively used by the user for any other functionality (e.g., reading emails, browsing the Internet, etc.) before being eligible to attempt to establish a secure connection with the second device (102).

4. Active Communication Session Criterion

In yet other embodiments, an active communication session criterion may comprise determining that the first device is engaged in an active communication session, e.g., an active audio/visual communication session that may comprise the transmission of one or more images to another device. Such an active communication session criterion may be used, e.g., if it is desired that the first device is able to broadcast its eligibility to attempt to establish a secure connection with the second device if it is actively capturing images and/or audio that it is contributing to part of an active communication session. In such a situation, a user may desire to have management of the active communication session transferred to the second device, while continuing to use an image capture device(s) of the first device to capture the one or more images being transmitted as part of the active communication session.

5. Direction Criterion

In yet other embodiments, a device direction criterion may comprise determining that the first electronic device is facing in a particular direction with respect to the second device (102) before being eligible to attempt to establish a secure connection with the second device (102). For example, even if the first device meets an orientation state criterion (e.g., is in a perfect landscape orientation), an additional device direction criterion may be established, e.g., that the "front side" (or "back side," depending on the convention used) of the first device also be facing in the same direction as a display of the second device before being eligible to attempt to establish a secure connection with the second device (102). In some implementations, this may be due to the fact that it is known (or that a user has indicated) that they are only interested in using a "back side" image capture device of the first device during a secure connection with the second device. Thus, unless the "back side" of the first device is facing the user, there is no need to attempt to automatically establish a secure connection with the second device.

6. Proximity Criterion

In yet other embodiments, a device proximity criterion may comprise determining that the first device is within a threshold distance of the second device (e.g., within 2 feet, 1 meter, 6 feet, etc.). Such a device criterion may be used, e.g., if it is desired that the first device only be eligible to attempt to establish a secure connection with the second device (102) if it is located in close proximity to the second device (102). For example, as shown in FIG. 1, there is an exemplary boundary 108 drawn in each of Scenarios A, B, and C, that is defined as a spherical region (having radius 110) from the center of second device 102. It is to be understood that the spherical example is only illustrative, and the device proximity criterion may be specified in any desired manner, e.g., in terms of a fixed or dynamic signal strength value measured from a signal being emitted from the other device, raw distance, line of sight, a required successful type of mechanical or magnetic connection between the first device and second device, etc. As may now be understood, in the Scenarios A, B, and C of FIG. 1, the first device 104 must be within the exemplary boundary 108 in order to satisfy the proximity criterion and be eligible to attempt to establish a secure connection with the second device (102).

7. User Account Criterion

In yet other embodiments, a user account criterion may be defined, wherein, e.g., the first device and second device must be associated with a same user or a same user account in order to be eligible to attempt to establish a secure connection between the first device (104) and second device (102). Such a user account criterion may be used, e.g., if it is desired that a first device does not inadvertently attempt to connect to a nearby second device of another user, thereby preserving the user of the first device's privacy and stopping the first device from showing up on any other users' device as an eligible device to establish a secure connection with.

In some embodiments, rather than (or in addition to) being explicitly specified by a user, the first set of device state criteria may be learned on an individual or customized basis for a given user and/or a given first device over time. For example, if a particular user consistently attempts to establish a connection between his or her first device and second device when the first device is in a particular state (e.g., mounted in a holding clamp, with the screen of the first device locked, within 6 inches of the second device, and between 5:00 pm to 5:05 pm), then the device can begin to learn (e.g., using machine learning techniques) and/or customize (e.g., with explicit user approval or confirmation) the particular set of device state criteria that are to be enforced before attempting to establish a secure connection with a second device. In this way, the device state criteria can be made to align with the device state most-often observed (or explicitly defined by the user) when establishing a secure connection with a second device.

Returning now to Scenario A (100A), the first device (104A) is within a threshold difference of a predetermined device activation orientation state (e.g., in this example, a perfect landscape orientation). However, the first device (104A) is not within a threshold distance of the second device (102) (e.g., in this example, within exemplary boundary 108). Assuming that, in this example, the aforementioned horizontal device activation orientation state criterion and the boundary 108 proximity criterion are the only criteria defined in the first set of device state criteria, then the first device (104A) would not be eligible to establish a connection with second device (102), as indicated by the symbol 107A, reflecting no connection being established between the first device (104A) and the second device (102).

Turning now to Scenario B (100B), a first device (104B) and the second device (102) are again in proximity to one another and attempting to form a secure connection. In Scenario B (100B), however, the first device (104A) is in a portrait orientation and thus not within a threshold difference of a predetermined device activation orientation state (e.g., in this example, a perfect landscape orientation), but the first device (104A) is within a threshold distance of the second device (102) (i.e., within exemplary boundary 108). Assuming again that, in this example, the aforementioned horizontal device activation orientation state criterion and the boundary 108 proximity criterion are the only criteria defined in the first set of device state criteria, then the first device (104B) would again not be eligible to establish a connection with second device (102), as indicated by the symbol 107B, reflecting no connection being established between the first device (104B) and the second device (102).

Turning now to Scenario C (100C), a first device (104C) and the second device (102) are again in proximity to one another and attempting to form a secure connection. In Scenario C (100C), the first device (104C) is in a landscape orientation and thus within a threshold difference of a predetermined device activation orientation state (e.g., in this example, a perfect landscape orientation), and the first device (104C) is also within a threshold distance of the second device (102) (i.e., within exemplary boundary 108). Assuming again that, in this example, the aforementioned horizontal device activation orientation state criterion and the boundary 108 proximity criterion are the only criteria defined in the first set of device state criteria, then the first device (104C) would be eligible to establish a connection with second device (102), as indicated by the symbol 107C, reflecting a secure wireless connection successfully being established between the first device (104C) and the second device (102).

Exemplary image 109 represents an image that was captured by an image capture device 105 of the first device (104C) and then transmitted via secure connection 107C to the second device (102), where it may subsequently be stored, displayed, and/or transmitted to another third device, etc. In some embodiments, the first device (104C) may automatically attempt to establish its connection to the second device (102), i.e., in response to the first set of device state criteria being met and, if the connection is successful, the first device (104C) may either be automatically selected for use by second device (102) (or appear in a list of available image capture device sources at second device 102 for manual user selection). In some embodiments, the first device 104C could appear seamlessly alongside any other image capture sources available for selection at the second device 102, e.g., alongside image capture devices internal to second device 102 (such as image capture device 106), image capture device connected directly to second device 102 (e.g., via a USB port), and so forth.

In some implementations, if a first electronic device has not connected to a second electronic device of a particular user according to the secure connection techniques described herein after a predetermined amount of time (e.g., 30 days, 60 days, 1 year, etc.), then the use of the device state criteria detection and secure connection frameworks described herein may be disabled, e.g., until affirmatively re-activated by the user.

Figure 2:
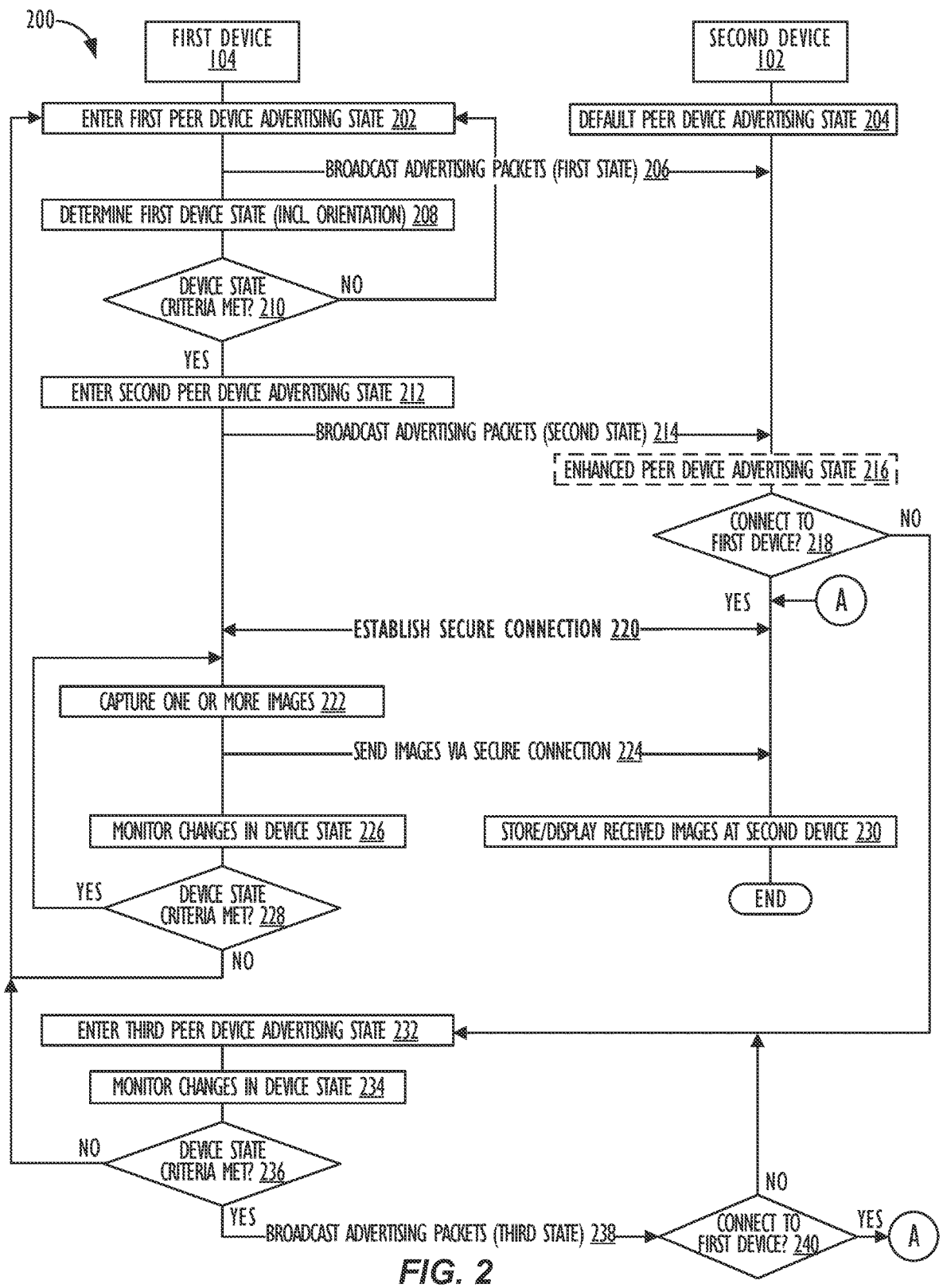
FIG. 2 illustrates an exemplary process flow diagram for establishing a secure connection between electronic devices for streaming audio and video data is shown, according to one or more embodiments.

Exemplary Process Flow Diagram for Establishing a Secure Connection between Electronic Devices Turning now to FIG. 2, an exemplary process flow diagram 200 for establishing a secure connection between electronic devices for streaming audio and video data is shown, according to one or more embodiments. Beginning at block 202, a first device (104) may enter into a first peer device advertising protocol state. As will be explained in greater detail with reference to FIG. 3 below, in some embodiments, the first peer device advertising protocol state may comprise a "default" or "low power" advertising state, which is configured to have a minimum advertising duty cycle and/or maximum time interval delay between the broadcasting of advertising packets.

Next, at 206, the first device broadcasts advertising packets to any devices in its proximity, e.g., according to the parameters of the first peer device advertising protocol state. As shown in FIG. 2, in some cases, a second device (102) may be in proximity to the first device and operating in its own default peer device advertising state (block 204), which may or may not be the same as the first peer device advertising protocol state that the first device is operating under.

Next, at block 208, the first device determines a first device state for itself (which, in some embodiments, may comprise at least an orientation state component). At block 210, if a first set of device state criteria are not met (i.e., 'NO' at block 210), the first device may return to block 202, and remain in the "default" or "low power" first peer device advertising protocol state. If, instead, at block 210, if it is determined that the first set of device state criteria are met by the first device (i.e., 'YES' at block 210), the first device may proceed to block 212, and enter into a second peer device advertising protocol state. At 214, the first device broadcasts advertising packets to any devices in its proximity, e.g., according to the parameters of the second peer device advertising protocol state. As will be explained in greater detail with reference to FIG. 3 below, in some embodiments, the second peer device advertising protocol state may comprise a "enhanced" or "high power" advertising state, which is configured to have a maximum permitted advertising duty cycle and/or minimum permitted time interval delay between the broadcasting of advertising packets. In some such embodiments, the second peer device advertising protocol state may be configured so as to facilitate a more rapid connection between the first device and second device, since it has been determined that the first device currently meets the first set of device state criteria (e.g., the first device is in a state indicative of the fact that it is ready and/or likely desired to make a connection to a second device). In some embodiments, the first device operating in the "enhanced" or "high power" second peer device advertising protocol state may also cause the second device to enter into an enhanced peer device advertising state (block 216) and vice versa, i.e., either device that is part of a formed connection could initiate the other device entering into an enhanced or higher power advertising state, e.g., if any necessary pre-conditions or criteria are met.

Next, at block 218, if the first device and second device are able to successfully form a connection (i.e., 'YES' at block 218), the process flow 200 may proceed to 220 to establish a secure connection for data transfer, e.g., via a secure wireless peer-to-peer connection protocol. Note that, in some embodiments, the secure wireless peer-to-peer connection protocol may be a different protocol (and/or use a different radio device) than the peer device advertising protocol that was used for the devices to locate each other initially. At block 222, the first device may proceed to capture one or more images (or other desired forms of A/V data—or even non-A/V data) and, at 224, send the one or more captured images to the second device via the secure connection.

In some embodiments, the first device may be capable of detecting an interruption event at the first device (e.g., an incoming phone call, text message, email, or the like) and, in response to such detection, pausing the sending of images to the second device at 224 during the duration of the interruption event and, optionally, resuming the sending of images after the conclusion of the detected interruption event. In other embodiments, there may be a user interface option for a user to affirmatively indicate a desire to pause/interrupt an image sharing session, e.g., if the user needs to access functionality of the first electronic device for some other reason. In still other embodiments, the first device may be capable of receiving image capture-related parameters from the second device (e.g., a focus parameter, a zoom parameter, an exposure parameter, or the like) and, in response to receiving such image capture-related parameters, capturing subsequent images at 222 with a first image capture device according to the received image capture-related parameters.

At block 230, the second device may then proceed to store, display, and/or transmit, etc., the received one or more images, as needed. For example, if the second device is engaged in (or managing) an active communication session with another device, the received one or more images may be seamlessly transmitted on to the another device as a part of the communication session. The receiving of images could then continue at the second device until an indication to end the connection session is received at the second device, e.g., by a user affirmatively ending the session, selecting a different image capture device to serve as a source of images, ending an active communication session, taking the first device out of a state where it is meeting the first set of device state criteria, etc.

Returning now to block 218, if the first device and second device are not able to successfully form a connection (i.e., 'NO' at block 218), the process flow 200 may proceed to 232, wherein the first device enters into a third peer device advertising protocol state. As will be explained in greater detail with reference to FIG. 3 below, in some embodiments, the third peer device advertising protocol state may comprise an advertising state that uses a duty cycle and/or time interval delay the broadcasting of advertising packets having a value falling between the "default" or "low power" first advertising state and the "enhanced" or "high power" second advertising state. Once in the third peer device advertising protocol state, the first device may, at block 234, continue to monitor for changes in the first device's state. If, for example, the first set of device state criteria are no longer being met by the first device (i.e., 'NO' at block 236), the process flow 200 may return to 202, wherein the first device returns to the first peer device advertising protocol state. If, instead, the first set of device state criteria remain being met by the first device (i.e., 'YES' at block 236), the first device may, at 238, continue to broadcast advertising packets according to the third peer device advertising protocol state. If there is a new successful connection between the first device and a second device (i.e., 'YES' at block 240), the first device may return to the circle labeled "A" in FIG. 2 and re-establish a secure connection at 220. If, instead, there is no new successful connection between the first device and a second device (i.e., 'NO' at block 240), the first device may return to block 232 and remain in the third peer device advertising protocol state, attempting to find a second device to successfully connect to. In some embodiments, there may be a maximum permitted time interval in which the first device can remain in the third peer device advertising protocol state, after which it may simply return to block 202 and the default or first peer device advertising protocol state.

Returning now to 224, wherein the first device is sending one or more captured images to the second device via the secure connection, during this time, the first device may also, at block 226, continue to monitor for changes in the first device's state. If, for example, the first set of device state criteria are no longer being met by the first device (i.e., 'NO' at block 228), the process flow 200 may return to 202, wherein the first device disconnects from the second device and returns to the first peer device advertising protocol state. If, instead, the first set of device state criteria remain being met by the first device (i.e., 'YES' at block 228), the first device may continue, at block 222, to capture one or more images for transmission via the secure connection to the second device until, e.g., an indication to end a connection session is received at the second device, a different image capture device is selected to serve as a source of images for the second device, an active communication session that the first device is capturing images for is ended, the first device is taken out of a state where it is meeting the first set of device state criteria, etc.

Examples of Peer Device Advertising Protocol States

Figure 3:
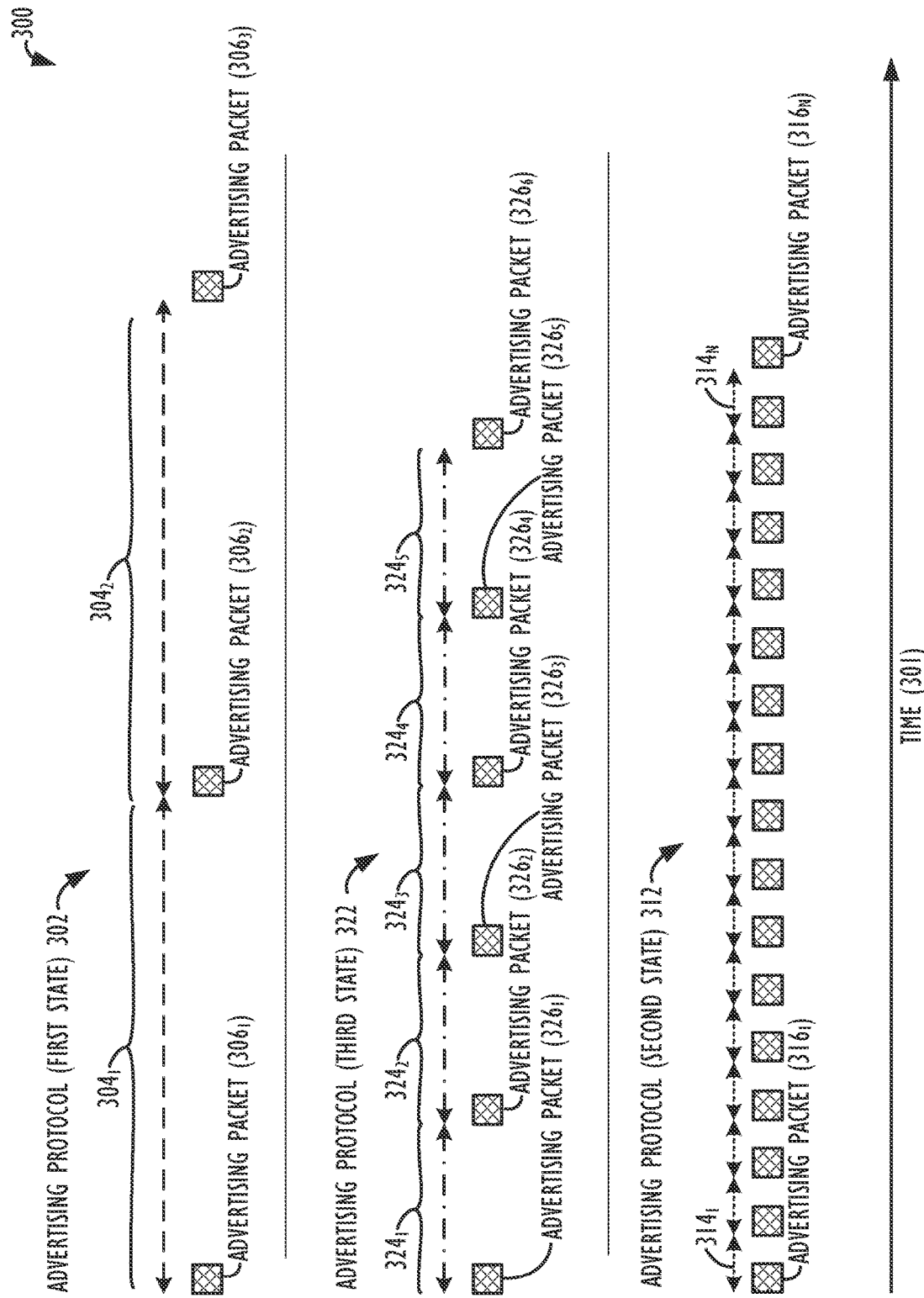
FIG. 3 illustrates exemplary peer device advertising protocol states, according to one or more embodiments.

Turning now to FIG. 3, an example 300 of various peer device advertising protocol states is shown, according to one or more embodiments. In example 300, a first advertising protocol state (302) comprises multiple sequential advertising packets $306_n$ being transmitted at a corresponding periodic time interval, $304_n$. According to some embodiments, the peer device advertising protocol may comprise Bluetooth® (BT), Bluetooth® Low Energy (BLE), or any other suitable type of wireless peer device advertising protocol.

(BLUETOOTH is a registered trademark of Bluetooth SIG, Inc.) Horizontal time axis (301) represents the passage of time from left to right across the page, wherein the farther apart any two advertising packets are, the longer the advertising interval is between the consecutive advertising packets. Thus, in one embodiment, an advertising protocol state could be represented in terms of the advertising interval between consecutive advertising packets.

As also illustrated in FIG. 3, each advertising packet $306_n$ takes up a finite duration of time, in which the device is broadcasting advertising packets. Thus, in a second embodiment, an advertising protocol state could be represented in terms of a duty cycle, i.e., the percentage of time that it spends broadcasting advertising packets over a given interval of time. It is to be understood that, if a second device is within broadcasting range of the device that is advertising itself, an appropriate handshake/connection protocol may be followed to allow the two devices to pair (or otherwise connect) to each other, e.g., in a wireless and peer-to-peer fashion. It is also to be understood that other devices may also be advertising themselves while a first device is advertising itself, and each device may also have a timing interval and/or duty cycle with which it "wakes up" or actively listens to see if any devices in proximity may be advertising themselves as interested in making a connection.

Second advertising protocol state (312) comprises multiple sequential advertising packets $316_n$ being transmitted at a corresponding periodic time interval, $314_n$. As illustrated, in this example 300, the time interval $314_n$ is shorter than periodic time interval, $304_n$ in the first advertising protocol state (302), also resulting in a larger advertising duty cycle than is experienced in the first advertising protocol state (302). As explained above with reference to FIG. 2, in some embodiments, the exemplary second advertising protocol state (312) may be entered into by a first device after determining that a first set of device state criteria are met by the first device. In some cases, the first set of device state criteria being met may be indicative of the fact that the first device is ready or expectant to enter into a connection with a second device, and thus may decide to (at least temporarily) enter into the aforementioned second advertising protocol state, which may place greater power and/or thermal requirements on the first device broadcasting its advertising packets. For this reason, in some embodiments, the first device may stay in the second state for no longer than a predetermined maximum time interval, such as 5 seconds, 10 seconds, 1 minute, etc.

Third advertising protocol state (322) comprises multiple sequential advertising packets $326_n$ being transmitted at a corresponding periodic time interval, $324_n$. As illustrated, in this example 300, the time interval, the time interval $324_n$ is shorter than periodic time interval, $304_n$ in the first advertising protocol state (302) but longer than periodic time interval, $314_n$ in the second advertising protocol state (312), resulting in a larger advertising duty cycle than is experienced in the first advertising protocol state (302), but in a smaller advertising duty cycle than is experienced in the second advertising protocol state (312). For example, in one implementation, the time interval $304_n$ may be 60 ms, while the time interval $314_n$ may be 10 ms, and the time interval $324_n$ may be 30 ms.

As explained above with reference to FIG. 2, in some embodiments, the exemplary second advertising protocol state (312) may be entered into by a first device after determining that a first set of device state criteria are met by the first device, but no successful connection to a second device was made after spending the predetermined maximum time interval in the second state. In this way, some amount of device power/thermal resources may be conserved, while still allowing for a faster than default connection time if/when a second device ready to complete a peer-to-peer connection arrives in proximity of the first device. As also explained above with reference to FIG. 2, in some embodiments, if the first device does not make a successful connection to a second device after spending some second predetermined maximum time interval in the second state, the first device may return to the first advertising protocol state (302). Likewise, in some embodiments, if the first device no longer meets the first set of device state criteria, the first device may return to the first advertising protocol state (302).

Figure 4A:
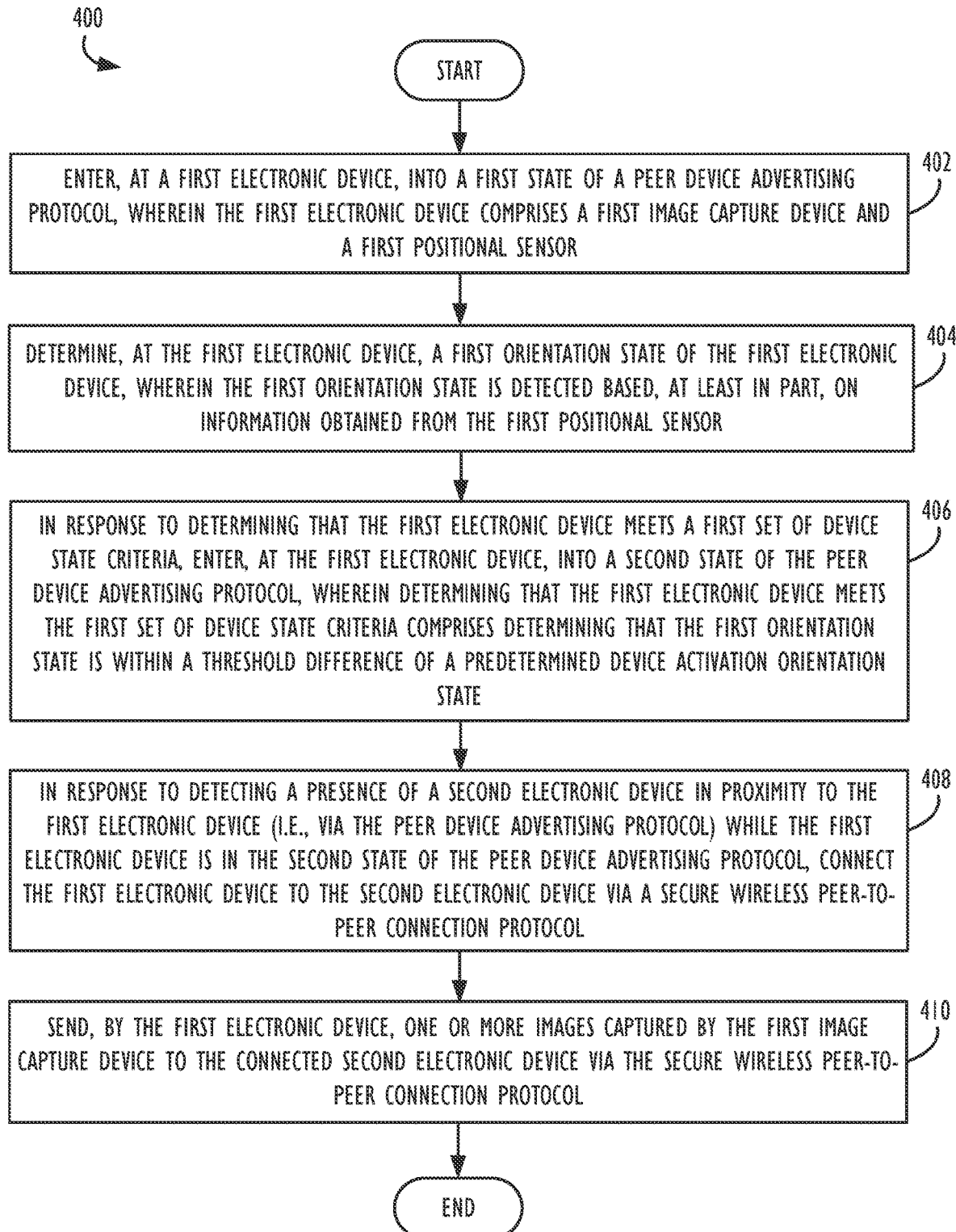
FIGS. 4A-4F are flow charts illustrating various methods of establishing a secure connection between electronic devices for streaming audio and video data, according to various embodiments.

Exemplary Methods of Automatically Establishing Secure Connections between Devices for Streaming Audio and Video Data FIG. 4A is a flow chart 400, illustrating a method of establishing a secure connection between electronic devices for streaming audio and video data, according to various embodiments. First, at Step 402, the method 400 may enter, at a first electronic device, into a first state of a peer device advertising protocol, wherein the first electronic device comprises a first image capture device (e.g., a camera) and a first positional sensor (e.g., an accelerometer or gyrometer). Next, at Step 404, the method 400 may determine, at the first electronic device, a first orientation state of the first electronic device, wherein the first orientation state is detected based, at least in part, on information obtained from the first positional sensor. The obtained first orientation state may comprise one or more of: a pitch, a roll, or a yaw of the first electronic device. In the case of roll and pitch, the orientation of the first electronic device may be expressed in terms of an angular displacement (positive or negative) from a direction of a gravity vector.

Next, at Step 406, in response to determining that the first electronic device meets a first set of device state criteria, the method 400 may cause the first electronic device to enter into a second state of the peer device advertising protocol (e.g., having an enhanced or increased duty cycle compared to the first state), wherein determining that the first electronic device meets the first set of device state criteria comprises determining that the first orientation state is within a threshold difference of a predetermined device activation orientation state. For example, if the predetermined device activation orientation state comprises the first electronic device being positioned in a perfectly horizontal landscape orientation, then a threshold difference of plus or minus 5 degrees may be established, such that, any time the first electronic device is within 5 degrees of a perfectly horizontal landscape orientation, it may be determined by the method 400 that at least the orientation state criterion of the first set of device state criteria is met. (It is to be understood that the first set of device state criteria may also include one or more other criterion that are not orientation state-related, such as criterion related to amount of movement, device power state, and so forth.)

Next, at Step 408, in response to detecting a presence of a second electronic device in proximity to the first electronic device (i.e., via the peer device advertising protocol) while the first electronic device is in the second state of the peer device advertising protocol, the method 400 may cause the first electronic device to connect to the second electronic device via a secure wireless peer-to-peer connection protocol. In some implementations, a visual or audible cue may be produced at either the first electronic device and/or the second electronic device once a successful connection has been established. Once the connection is established, at Step 410, the method 400 may cause the first electronic device to send one or more images captured by the first image capture device of the first electronic device to the connected second electronic device via the secure wireless peer-to-peer connection protocol, wherein the images may be displayed, stored, further manipulated, transmitted, etc. by the second electronic device. In some cases, the images captured by the first image capture device may contain cropped portions of the first image capture device's FOV, e.g., portions cropped specifically to capture a human or animal subject's face, a predetermined portion of the first image capture device's FOV, or a document, table or other flat surface in the captured scene, etc.

Figure 4B:
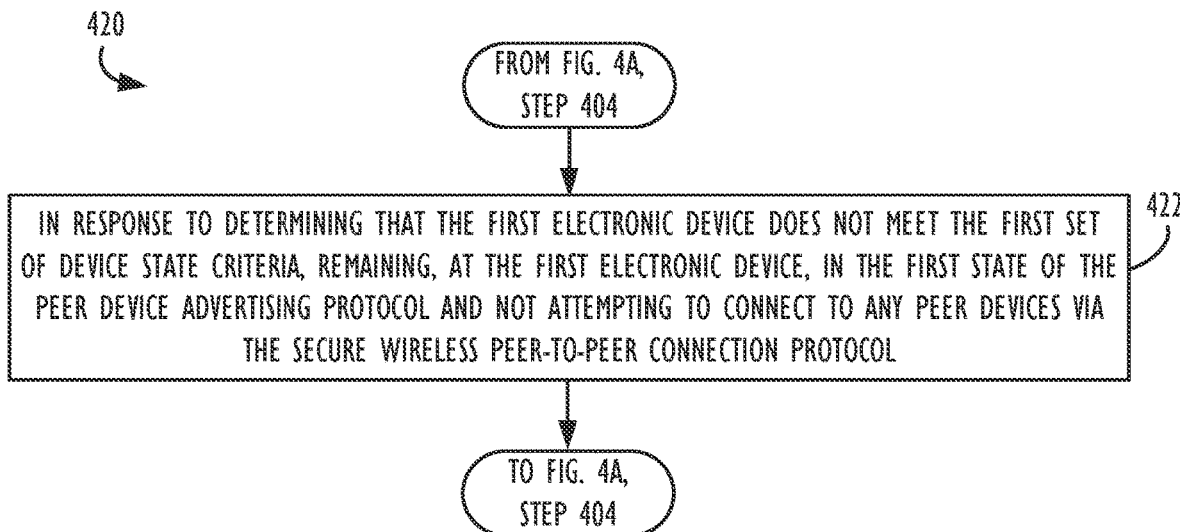

FIG. 4B is a flow chart 420, illustrating additional details to method 400, according to various embodiments. First, at Step 422, which may be performed during the performance of Step 404, the method 420 may, in response to determining that the first electronic device does not meet the first set of device state criteria, cause the first electronic device to remain in the first state of the peer device advertising protocol and not attempt to connect to any peer devices via the secure wireless peer-to-peer connection protocol.

Figure 4C:
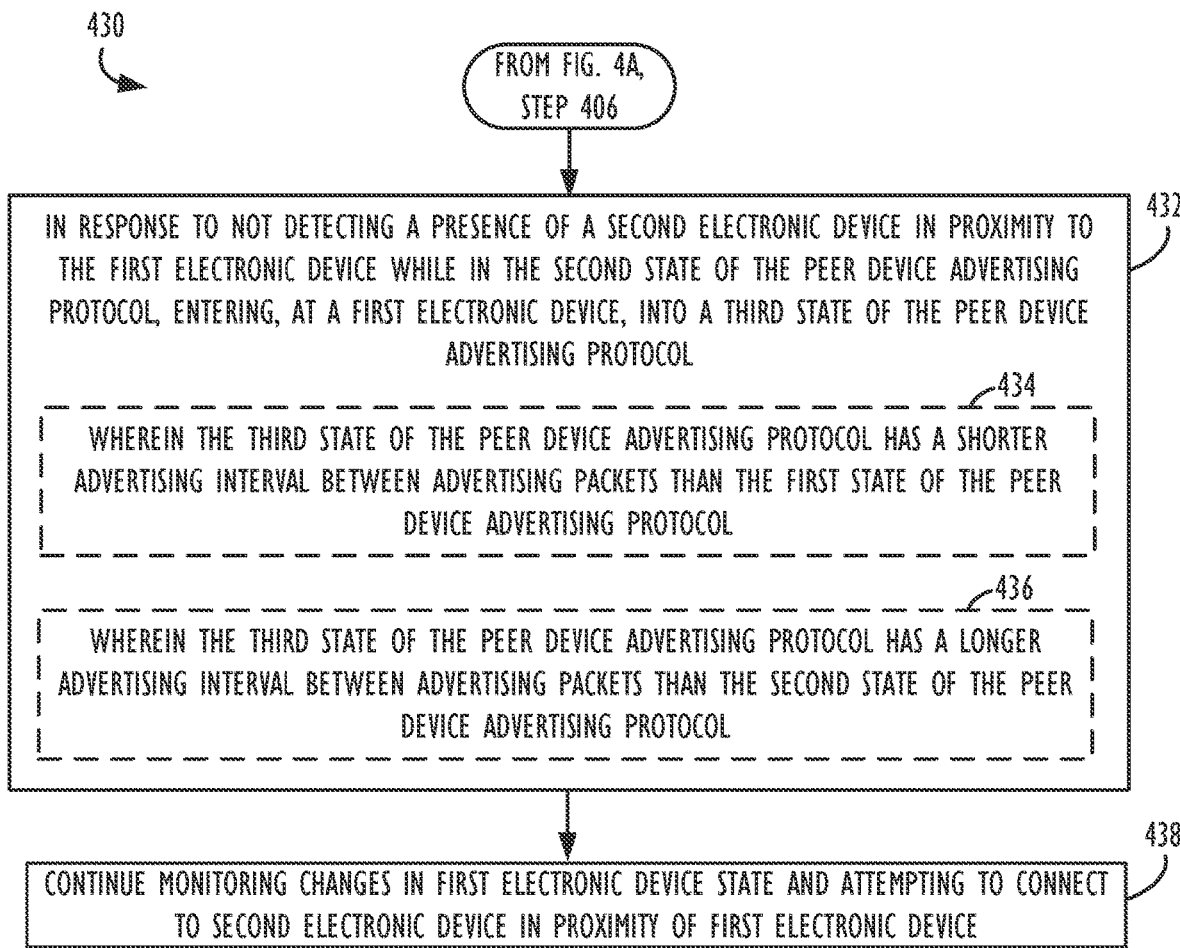

FIG. 4C is a flow chart 430, illustrating additional details to method 400, according to various embodiments. First, at Step 432, which may be performed during the performance of Step 406, the method 430 may, in response to not detecting a presence of a second electronic device in proximity to the first electronic device while the first electronic device is in the second state of the peer device advertising protocol, cause the first electronic device to enter into a third state of the peer device advertising protocol. In this embodiment, the third state of the peer device advertising protocol may have a shorter advertising interval between advertising packets than the first state of the peer device advertising protocol (434), but a longer advertising interval between advertising packets than the second state of the peer device advertising protocol (436). Next, at Step 438, the method 430 may, continue monitoring for changes in the device state of the first electronic device state and attempting to connect to any second electronic devices in proximity of first electronic device.

Figure 4D:
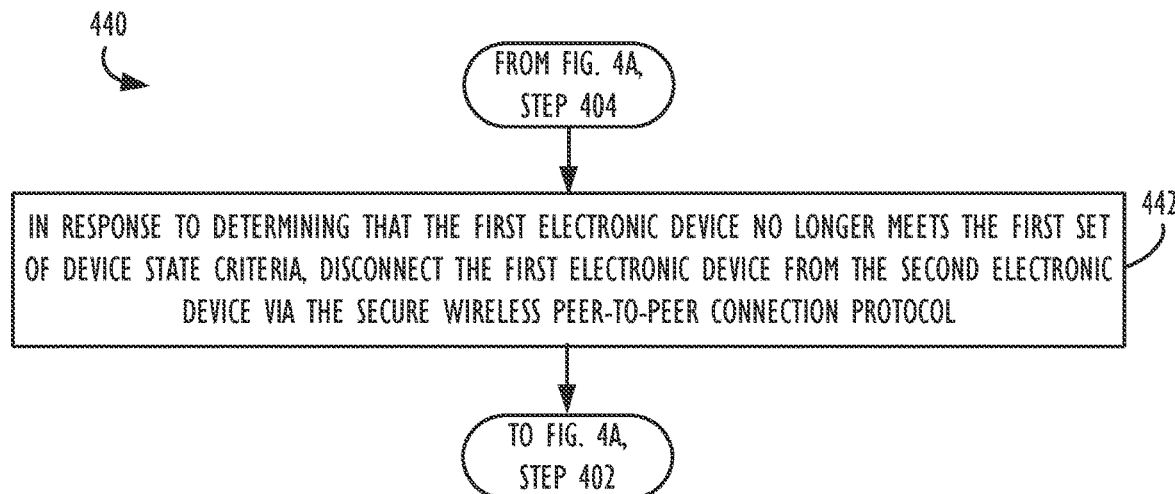

FIG. 4D is a flow chart 440, illustrating additional details to method 400, according to various embodiments. First, at Step 442, which may be performed during the performance of Step 404, the method 440 may, in response to determining that the first electronic device no longer meets the first set of device state criteria, disconnect the first electronic device from the second electronic device via the secure wireless peer-to-peer connection protocol, and then return operation flow to Step 402.

Figure 4E:
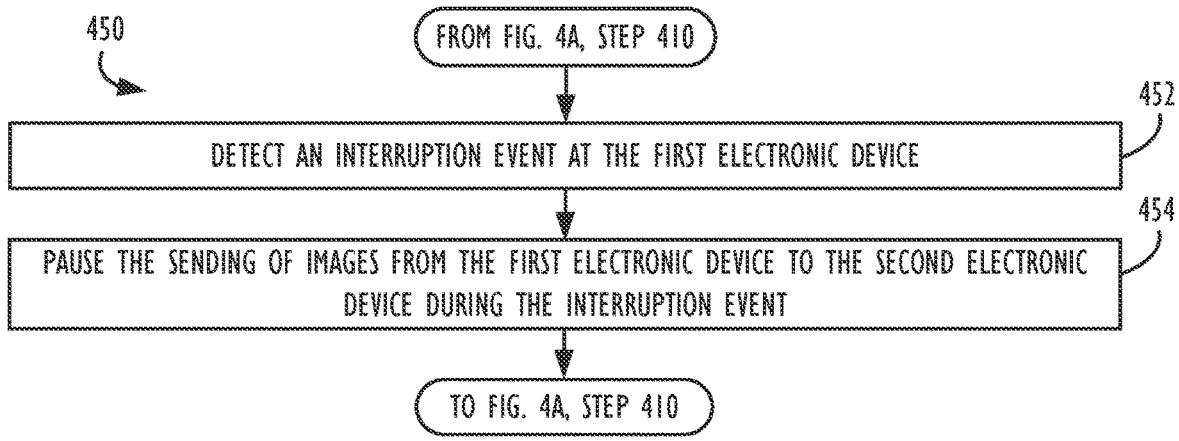

FIG. 4E is a flow chart 450, illustrating additional details to method 400, according to various embodiments. First, at Step 452, which may be performed during the performance of Step 410, the method 450 may detect an interruption event at the first electronic device. Next, at Step 454, the method 450 may pause the sending of images from the first electronic device to the second electronic device during the interruption event. Examples of interruption events at the first electronic device cause the first electronic device to pause the sending of images to the second electronic device may include receiving an incoming call, message, notification, or the like.

Figure 4F:
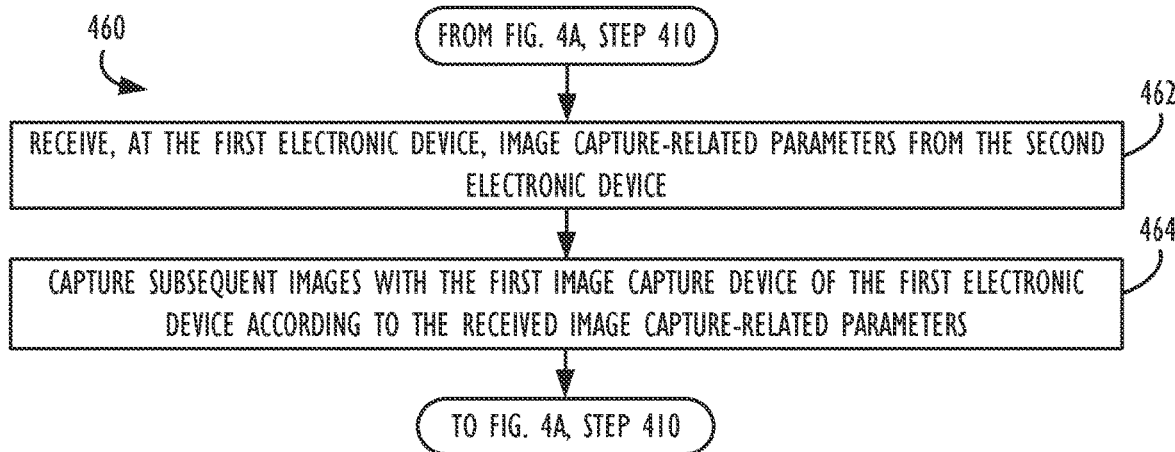

FIG. 4F is a flow chart 460, illustrating additional details to method 400, according to various embodiments. First, at Step 462, which may be performed during the performance of Step 410, the method 460 may receive, at the first electronic device, image capture-related parameters from the second electronic device. Next, at Step 464, the method 460 may capture subsequent images with the first image capture device of the first electronic device according to the received image capture-related parameters. Examples of image capture-related parameters received at the first electronic device may include changes to a focus setting, zoom setting, exposure setting, white balance, or the like of the first image capture device at the first electronic device.

Figure 5:
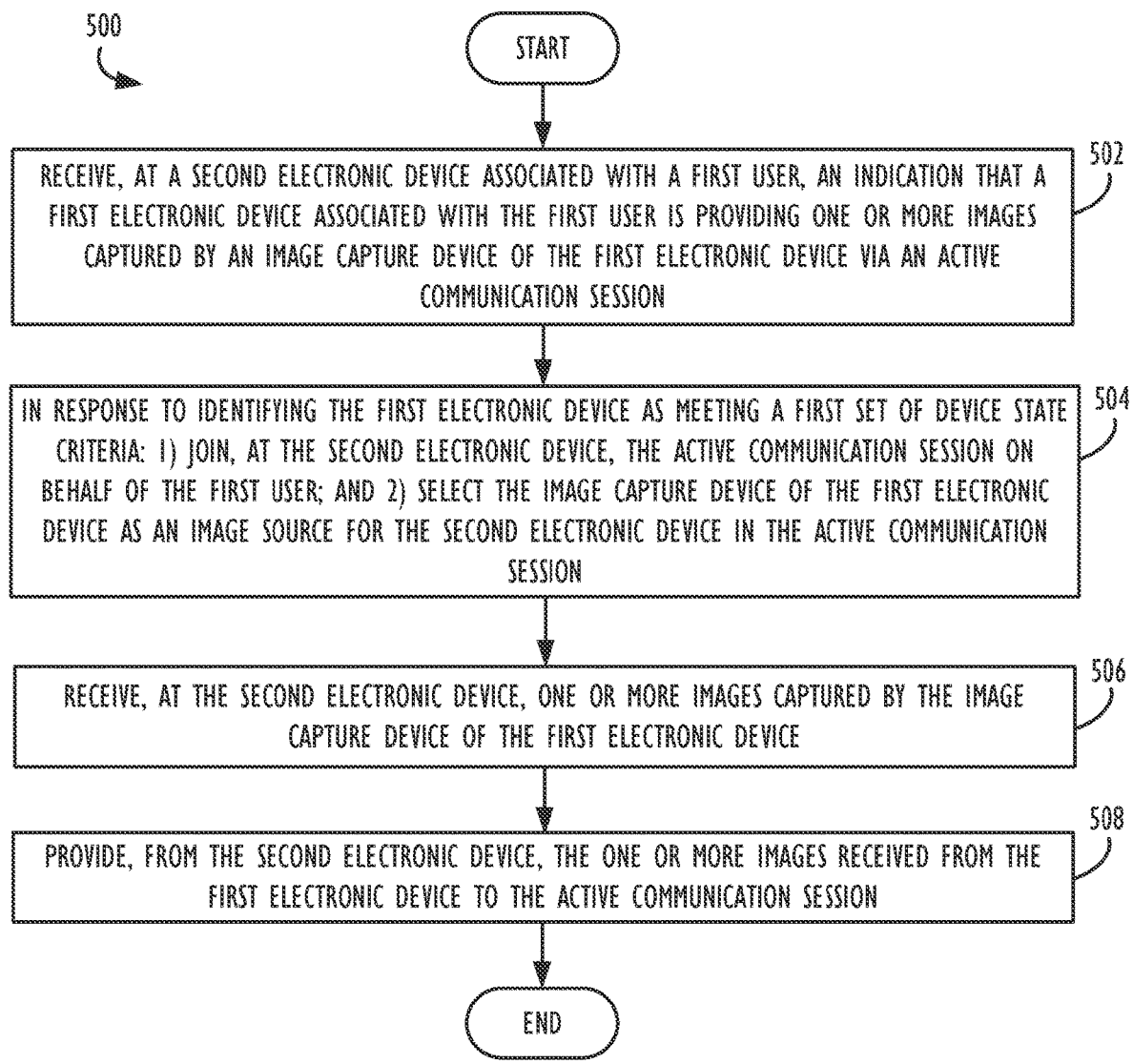
FIG. 5 is a flow chart illustrating a method of handing off control over an active audiovisual (A/V) communication session from a first electronic device to a second electronic device, according to various embodiments.

FIG. 5 is a flow chart 500, illustrating a method of "handing off" control over an active communication session (e.g., an audiovisual communication session) from a first electronic device to a second electronic device, according to various embodiments. First, at Step 502, the method 500 may receive, at a second electronic device (e.g., a media device, such as, for example, a Smart TV-style of device), an indication that a first electronic device (e.g., a mobile device, such as, for example, a cellular phone or tablet) is providing one or more images captured by an image capture device of the first electronic device via an active communication session. In some embodiments, the first and second electronic devices are associated with the same user account. For example, in some implementations, the indication may comprise a broadcast invitation sent by the first electronic device to nearby devices associated with the same user or same user account that there is an ongoing communication session that is capable of being "handed off." In some embodiments, there is a trust relationship between the first electronic device and second electronic device. In some implementations, the first electronic device and the second electronic device have been paired. For example, in some implementations, the indication may comprise a broadcast invitation sent by the first electronic device to nearby devices (that have been paired with the first electronic device) that there is an ongoing communication session that is capable of being "handed off."

Next, at Step 504, in response to identifying the first electronic device as meeting a first set of device state criteria, the second electronic device may: 1) join the active communication session on behalf of the first user; and 2) select the image capture device of the first electronic device as an image source for the second electronic device in the active communication session. When the second electronic device joins the active communication session on behalf of the first user, all management and control over the session (e.g., when to initiate the session, when to terminate the session, adding new parties to the session, using filters or other visual effects on the images contributed to the session, switching image capture devices being used to capture images for the session, etc.) may effectively be transferred to the second electronic device, without terminating the user's participation in the communication session during the hand-off operation.

Next, at Step 506, the second electronic device may receive one or more images captured by the image capture device of the first electronic device. Finally, at Step 508, the second electronic may provide the one or more images received from the first electronic device to the active communication session. It is to be understood that the images received may also be displayed, stored, etc., locally at the second electronic device, as needed. It is also to be understood that the second electronic device may also be able to toggle between various image capture devices to serve as the image source for the active communication session, e.g., from among various image capture devices that may be integrated into the first electronic device, various image capture devices that may be integrated into (or directly connected to) the second electronic device, or even other devices associated with the user that have image capture device(s) and are located in proximity to (and are able to form a suitable connection with) the second electronic device.

Figure 6:
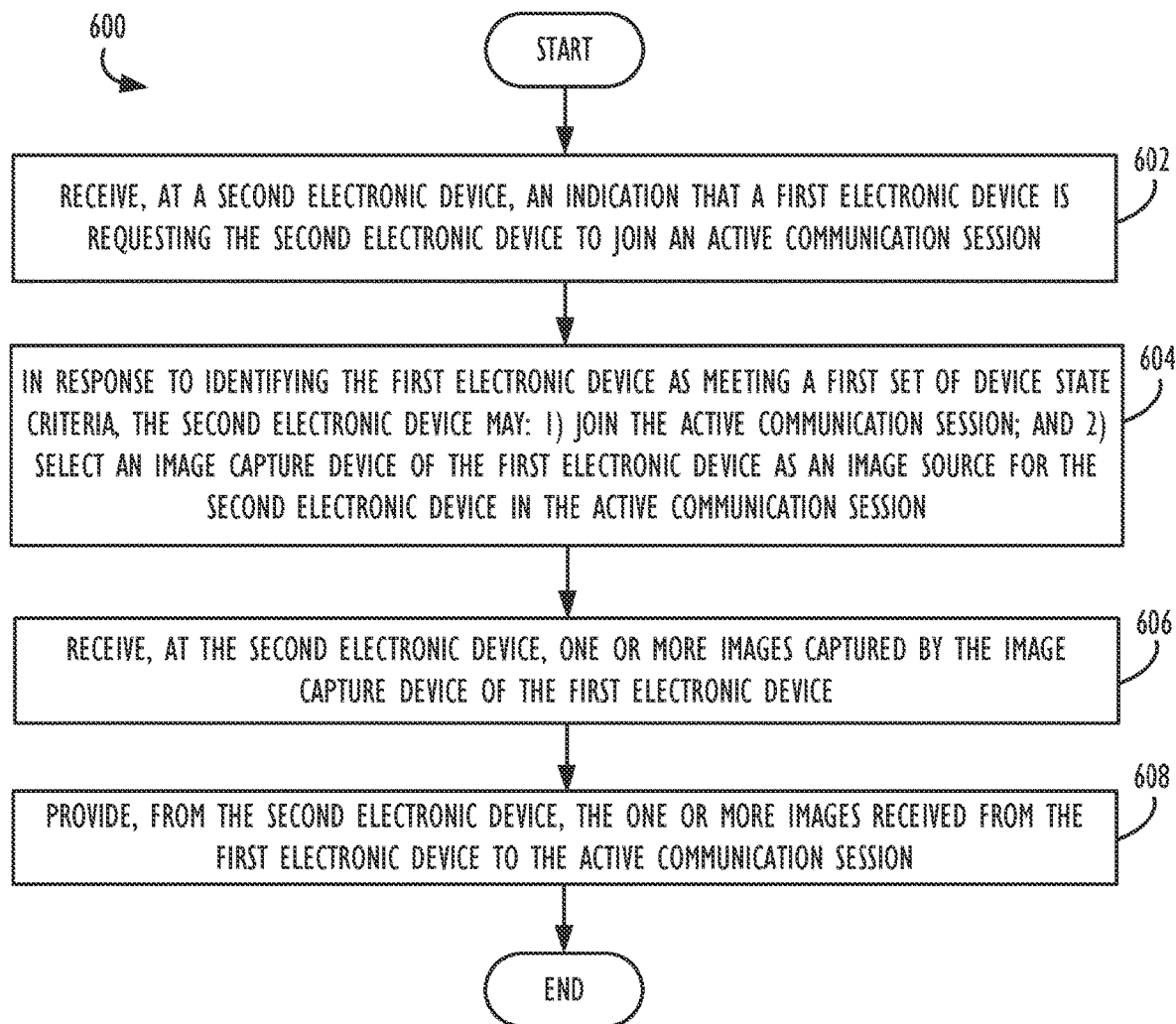
FIG. 6 is a flow chart illustrating a method of pushing an active av communication session from a first electronic device to a second electronic device, according to various embodiments.

FIG. 6 is a flow chart 600, illustrating a method of pushing an active communication session (e.g., an audiovisual communication session) from a first electronic device to a second electronic device, according to various embodiments. First, at Step 602, the method 600 may receive, at a second electronic device (e.g., a media device, such as, for example, a Smart TV-style of device), an indication that a first electronic device (e.g., a mobile device, such as, for example, a cellular phone or tablet) is requesting the second electronic device to join an active communication session. In some embodiments, there is a trust relationship between the first electronic device and second electronic device. In some implementations, the first electronic device and the second electronic device have been paired. For example, in some implementations, the indication may comprise a broadcast invitation sent by the first electronic device to nearby devices (that have been paired with the first electronic device). In some embodiments, the first and second electronic devices are associated with the same user account. For example, in some implementations, the indication may comprise a broadcast invitation sent by the first electronic device to nearby devices associated with the same user or same user account.

Next, at Step 604, in response to identifying the first electronic device as meeting a first set of device state criteria, the second electronic device may: 1) join the active communication session; and 2) select an image capture device of the first electronic device as an image source for the second electronic device in the active communication session. In some embodiments, when the second electronic device joins the active communication session, one or more operations for management and control over the session (e.g., when to initiate the session, when to terminate the session, adding new parties to the session, using filters or other visual effects on the images contributed to the session, switching image capture devices being used to capture images for the session, etc.) may effectively be transferred to the second electronic device. In some embodiments, when the second electronic device joins the active communication session, the first electronic device maintains control of orchestration of the communication session, such that, if the first electronic device leaves the communication session, the second electronic device also leaves the communication session.

In some embodiments, when the second electronic device joins the active communication session, it constructs a temporary video stream prior to receiving a video stream from the first electronic device.

Next, at Step 606, the second electronic device may receive one or more images captured by the image capture device of the first electronic device. Finally, at Step 608, the second electronic may provide the one or more images received from the first electronic device to the active communication session (e.g., as a video stream). In some embodiments, if the second electronic device had created a temporary video stream, at Step 608, the second electronic device replaces the temporary video stream with a video stream provided by the first electronic device. It is to be understood that the images received may also be displayed, stored, etc., locally at the second electronic device, as needed. It is also to be understood that the second electronic device may be able to toggle between various image capture devices to serve as the image source for the active communication session, e.g., from among various image capture devices that may be integrated into the first electronic device, various image capture devices that may be integrated into (or directly connected to) the second electronic device, or even other devices associated with the user that have image capture device(s) and are located in proximity to (and are able to form a suitable connection with) the second electronic device.

As may be appreciated, the various methods described herein, e.g., with reference to FIGS. 4-6, may be performed by an electronic device, e.g., via being initiated by an application (or "App") executing on the device and/or the device's native operating system (OS). For example, an App executing on the device could initiate or implement all of the steps in a method, or at least a portion of the steps in the method, while making calls to the device's OS to perform other steps in the method. Similarly, a device's OS can receive API calls from an App or elsewhere and process/perform the calls to cause the method to be performed by the device(s).

Exemplary Electronic Computing Devices

Figure 7:
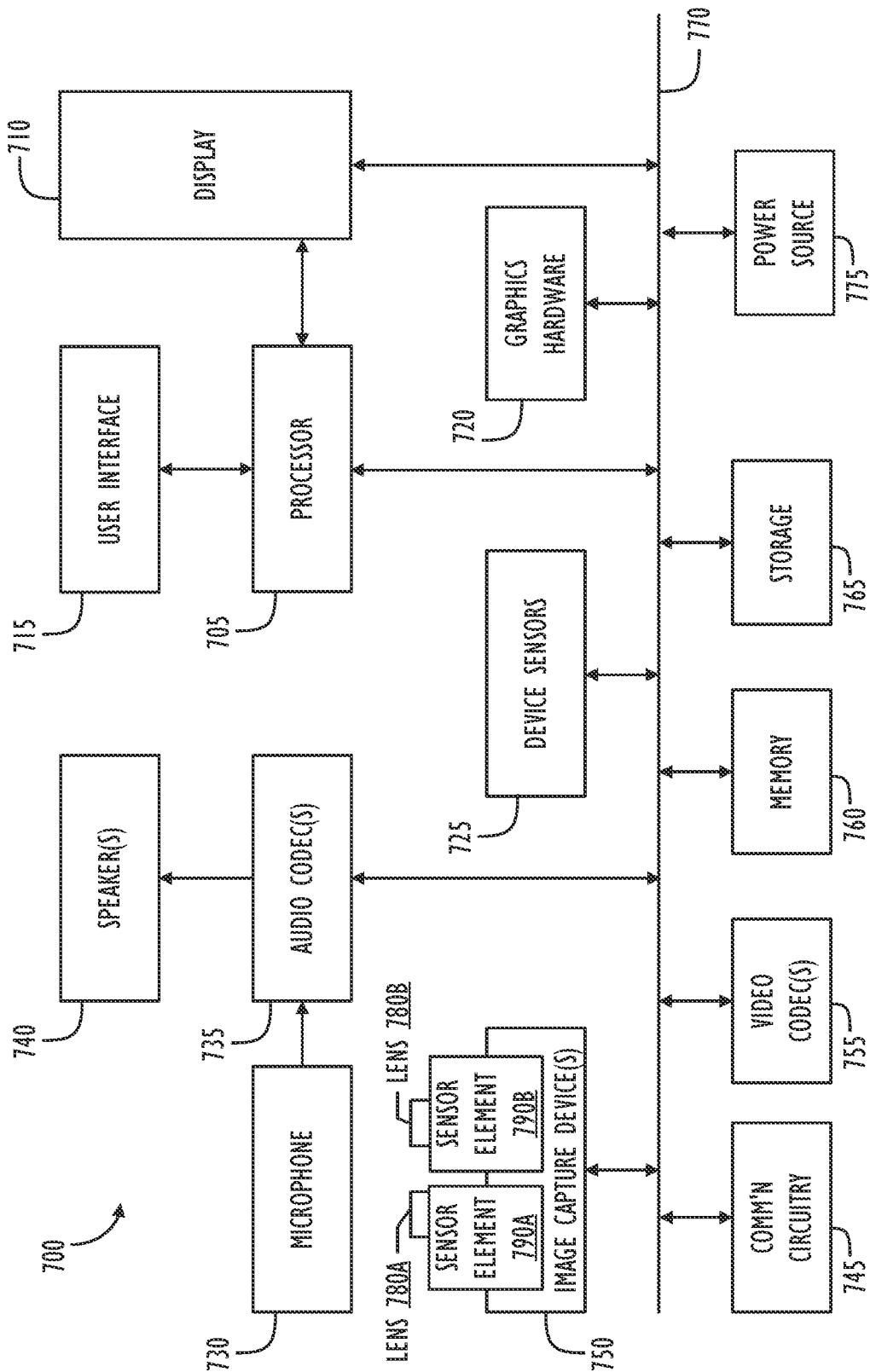
FIG. 7 is a block diagram illustrating a programmable electronic computing device, in which one or more of the techniques disclosed herein may be implemented.

Referring now to FIG. 7, a simplified functional block diagram of illustrative programmable electronic computing device 700 is shown according to one embodiment. Electronic device 700 could be, for example, a mobile telephone, personal media device, portable camera, or a tablet, notebook or desktop computer system. As shown, electronic device 700 may include processor 705, display 710, user interface 715, graphics hardware 720, device sensors 725 (e.g., proximity sensor/ambient light sensor, accelerometer, inertial measurement unit, and/or gyrometer), microphone 730, audio codec(s) 735, speaker(s) 740, communications circuitry 745, image capture device 750, which may, e.g., comprise multiple camera units/optical image sensors having different characteristics or abilities (e.g., Still Image Stabilization (SIS), HDR, OIS systems, optical zoom, digital zoom, etc.), video codec(s) 755, memory 760, storage 765, and communications bus 770.

Processor 705 may execute instructions necessary to carry out or control the operation of many functions performed by electronic device 700 (e.g., such as the generation, processing, and/or streaming of images and video data in accordance with the various embodiments described herein). Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 710 may display a video stream as it is captured while processor 705 and/or graphics hardware 720 and/or image capture circuitry contemporaneously generate and store the video stream in memory 760 and/or storage 765. Processor 705 may be a system-on-chip (SOC) such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks.

In one embodiment, graphics hardware 720 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 750 may comprise one or more camera units configured to capture images, e.g., images which may be processed to generate framed and/or distortion-corrected versions of said captured images, e.g., in accordance with this disclosure. Image capture device(s) 750 may include two (or more) lens assemblies 780A and 780B, where each lens assembly may have a separate focal length. For example, lens assembly 780A may have a shorter focal length relative to the focal length of lens assembly 780B. Each lens assembly may have a separate associated sensor element, e.g., sensor elements 790A/790B. Alternatively, two or more lens assemblies may share a common sensor element. Image capture device(s) 750 may capture still and/or video images. Output from image capture device 750 may be processed, at least in part, by video codec(s) 755 and/or processor 705 and/or graphics hardware 720, and/or a dedicated image processing unit or image signal processor incorporated within image capture device 750. Images so captured may be stored in memory 760 and/or storage 765.

Memory 760 may include one or more different types of media used by processor 705, graphics hardware 720, and image capture device 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705, such computer program code may implement one or more of the methods or processes described herein. Power source 775 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 700.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A method, comprising:
   receiving, at a second electronic device associated with a first user, an indication that a first electronic device associated with the first user is providing one or more images captured by an image capture device of the first electronic device via an active communication session;
   in response to identifying the first electronic device as meeting a first set of device state criteria: 1) joining, at the second electronic device, the active communication session on behalf of the first user; and 2) selecting the image capture device of the first electronic device as an image source for the second electronic device in the active communication session;
   receiving, at the second electronic device, one or more images captured by the image capture device of the first electronic device; and
   providing, from the second electronic device, the one or more images received from the first electronic device to the active communication session.

2. The method of claim 1, further comprising:
   displaying, at the second electronic device, the one or more images received from the first electronic device.

3. The method of claim 1, wherein identifying the first electronic device as meeting a first set of device state criteria further comprises:
   entering, at the second electronic device, into a peer device advertising protocol state.

4. The method of claim 3, wherein the peer device advertising protocol state comprises at least one of the following: a default advertising state; an enhanced advertising state; or a reduced-power advertising state.

5. The method of claim 3, wherein identifying the first electronic device as meeting a first set of device state criteria further comprises:
   detecting a presence of the first electronic device via the peer device advertising protocol.

6. The method of claim 1, wherein identifying the first electronic device as meeting a first set of device state criteria further comprises:
   detecting, at the second electronic device, that the first electronic device is in proximity to the second electronic device and oriented in a first orientation state that is within a threshold difference of a predetermined device activation orientation state.

7. The method of claim 1, wherein identifying the first electronic device as meeting a first set of device state criteria further comprises:
   detecting, at the second electronic device, that the first electronic device is in proximity to the second electronic device and that the image capture device of the first electronic device is oriented in a preferred direction relative to the second electronic device.

8. The method of claim 1, wherein the second electronic device is configured to join the active communication session on behalf of the first user without user input.

9. The method of claim 1, wherein the second electronic device is configured to join the active communication session on behalf of the first user in response to user input.

10. The method of claim 1, wherein the received one or more images captured by the image capture device of the first electronic device are received via a secure wireless peer-to-peer connection protocol.

11. The method of claim 1, further comprising:
    transmitting, by the second electronic device, the one or more images received from the first electronic device to a third electronic device.

12. A method, comprising:
    receiving, at a second electronic device, an indication that a first electronic device is requesting the second electronic device to join an active communication session;

in response to identifying the first electronic device as meeting a first set of device state criteria: 1) joining, at the second electronic device, the active communication session; and 2) selecting an image capture device of the first electronic device as an image source for the second electronic device in the active communication session;

receiving, at the second electronic device, one or more images captured by the image capture device of the first electronic device; and providing, from the second electronic device, the one or more images received from the first electronic device to the active communication session.

13. The method of claim 12, further comprising:
displaying, at the second electronic device, the one or more images received from the first electronic device.

14. The method of claim 12, wherein identifying the first electronic device as meeting a first set of device state criteria further comprises:
entering, at the second electronic device, into a peer device advertising protocol state.

15. The method of claim 12, wherein the second electronic device is configured to join the active communication session on behalf of a first user in response to user input.

16. The method of claim 12, wherein the received one or more images captured by the image capture device of the first electronic device are received via a secure wireless peer-to-peer connection protocol.

17. The method of claim 12, further comprising:
transmitting, by the second electronic device, the one or more images received from the first electronic device to a third electronic device.

18. A non-transitory computer readable medium comprising computer readable instructions executable by one or more processors to:
receive, at a second electronic device, an indication that a first electronic device is requesting the second electronic device to join an active communication session;
in response to identifying the first electronic device as meeting a first set of device state criteria: 1) join, at the second electronic device, the active communication session; and 2) select an image capture device of the first electronic device as an image source for the second electronic device in the active communication session;
receive, at the second electronic device, one or more images captured by the image capture device of the first electronic device; and
provide, from the second electronic device, the one or more images received from the first electronic device to the active communication session.

19. The non-transitory computer readable medium of claim 18, further comprising computer readable instructions executable by one or more processors to cause the second electronic device to:
display the one or more images received from the first electronic device.

20. The non-transitory computer readable medium of claim 18, wherein the computer readable instructions executable by one or more processors to identify the first electronic device as meeting a first set of device state criteria further comprise computer readable instructions executable by one or more processors to cause the second electronic device to:
enter into a peer device advertising protocol state.

* * * * *